United States Patent [19]

Wolt et al.

[11] Patent Number: 5,433,966
[45] Date of Patent: *Jul. 18, 1995

[54] METHOD FOR HEAT TREATING A BREAD BAKING WHEAT FLOUR AND RESULTING FLOUR AND DOUGH

[75] Inventors: Michael Wolt; Sambasiva R. Chigurupati; James Pulverenti, all of Omaha, Nebr.

[73] Assignee: Conagra, Inc., Omaha, Nebr.

[ * ] Notice: The portion of the term of this patent subsequent to Oct. 4, 2011 has been disclaimed.

[21] Appl. No.: 220,252

[22] Filed: Mar. 30, 1994

Related U.S. Application Data

[63] Continuation-in-part of Ser. No. 192,308, Feb. 4, 1994, Pat. No. 5,352,473, which is a continuation of Ser. No. 868,012, Apr. 12, 1992, abandoned, which is a continuation-in-part of Ser. No. 819,886, Jan. 13, 1992, abandoned.

[51] Int. Cl.$^6$ .............................................. A23L 1/10
[52] U.S. Cl. .................................... 426/549; 426/520; 426/521
[58] Field of Search .................... 426/549, 520, 521

[56] References Cited

U.S. PATENT DOCUMENTS

| | | |
|---|---|---|
| 2,525,599 | 10/1950 | Gustavson . |
| 3,159,495 | 3/1964 | Japikse . |
| 3,368,904 | 2/1968 | Young et al. . |
| 3,428,461 | 2/1969 | Hatton et al. . |
| 3,490,917 | 1/1970 | Doe . |
| 3,554,772 | 1/1971 | Haukinson . |
| 3,585,049 | 6/1971 | Galle . |
| 3,796,807 | 3/1974 | Whelan . |
| 3,869,558 | 3/1975 | Hampton . |
| 3,974,298 | 8/1976 | Cauvain . |
| 4,157,406 | 6/1979 | Hanamoto et al. . |
| 4,259,362 | 3/1981 | Hanamoto et al. . |
| 4,937,087 | 6/1990 | Bush . |
| 5,352,473 | 10/1994 | Chiqurupati ..................... 426/549 |

FOREIGN PATENT DOCUMENTS

| | | |
|---|---|---|
| 0188318 | 7/1986 | European Pat. Off. . |
| 2110065 | 5/1972 | France . |
| 101548 | 9/1978 | Japan . |
| 116657 | 5/1988 | Japan . |
| 6701205 | 7/1968 | Netherlands . |
| 180496 | 6/1922 | United Kingdom . |
| 228829 | 12/1924 | United Kingdom . |
| 228830 | 1/1925 | United Kingdom . |
| 228841 | 1/1925 | United Kingdom . |
| 263897 | 12/1926 | United Kingdom . |
| 300291 | 11/1928 | United Kingdom . |
| 300537 | 11/1928 | United Kingdom . |
| 300568 | 11/1928 | United Kingdom . |
| 310125 | 4/1929 | United Kingdom . |
| 543720 | 3/1942 | United Kingdom . |
| 1085562 | 5/1964 | United Kingdom . |
| 1499986 | 2/1978 | United Kingdom . |
| WO91/11911 | 8/1991 | WIPO . |

OTHER PUBLICATIONS

Abstract of Japanese Patent Document 63014650.
Abstract of U.S. Pat. No. 4,904,493.
Abstract of Japanese Patent Document 62166831.
Modern Cereal Chemistry (Sixth Edition) by D. W. Kent-Jones and A. J. Amos, Food Trade Press 1967, pp. 175–178.

(List continued on next page.)

*Primary Examiner*—Carolyn Paden
*Attorney, Agent, or Firm*—Willian Brinks Hofer Gilson & Lione

[57] ABSTRACT

Wheat flour is heat treated by suspending it in a heated carrier gas having an outlet temperature of 50°–130° C. for 5–8 seconds to increase dough strength of the flour and to dry the flour to a moisture content of less than 7 wt %. Bread dough made with the heat treated flour exhibits improved baking characteristics with reduced requirements for chemical oxidizing agents, and this flour is therefore useful when eliminating potassium bromate from formulations. The heat treated flour makes an improved bread mix with an increased shelf life.

32 Claims, 1 Drawing Sheet

OTHER PUBLICATIONS

Cereal Chemistry—A Study of Some Methods of Examining Flour, With Special Reference to the Effects of Heat-I. Effects of Heat on Flour Proteins, by C. W. Herd, *Cereal Chemistry*, vol. VIII, Jan., 1931, No. 1., pp. 1–23.

A Study of Some Methods of Examining Flour, with Special Reference to the Effects of Heat-II. Effects of Heat on Four Enzymes, by C. W. Herd, *Cereal Chemistry*, vol. VIII, Mar. 1931, pp. 145–161.

Chemical and Physico–Chemical Changes Induced in Wheat and Wheat Products by Elevated Temperatures, by W. F. Geddes, *Can J. Res.*, I, pp. 528–559.

Chemical and Physico–Chemical Changes Induced in Wheat and Wheat Products by Elevated Temperatures-II, by W. F. Geddes, *Can J. Res.*, II, pp. 65–90.

Chemical and Physico–Chemical Changes in Wheat and Wheat Products Induced by Elevated Temperatures-III. The Influence of Germ Constituents on Baking Quality and Their Relation to Improvement in Flour Induced by Heat and Chemical Improves, by W. F. Geddes, *Can J. Res.*, II, pp. 195–213.

Flour Drying Flowsheet, Drawing 761-9010-2000, Oct. 23, 1990.

METHOD FOR HEAT TREATING A BREAD BAKING WHEAT FLOUR AND RESULTING FLOUR AND DOUGH

CROSS REFERENCE TO RELATED APPLICATION

This application is a continuation in part of U.S. patent application Ser. No. 08/192,308, filed Feb. 4, 1994, now U.S. Pat. No. 5,352,473, which is a continuation of U.S. patent application Ser. No. 07/868,012, filed Apr. 12, 1992, now abandoned, which is in turn a continuation in part of U.S. patent application Ser. No. 07/819,886, filed Jan. 13, 1992 (abandoned). The entire specification (including drawings) of parent application Ser. No. 07/868,012 is hereby incorporated by reference into the present specification.

BACKGROUND OF THE INVENTION

This invention relates to a method for heat treating a bread baking wheat flour to form a flour, and to the resulting flour and dough having improved baking characteristics.

It has been recognized for many years that the oxidation of a wheat flour can improve the rheological and baking performance of the flour in a yeast leavened dough system. Freshly milled flours tend to produce doughs which are excessively pliable and lack the elasticity to produce optimum finished bread characteristics. When flour is stored with free access to the air, a slow oxidation process takes place which is referred to as aging or maturing of the flour. Properly matured flour produces a more lively, more elastic dough characteristic as compared to freshly milled flour. Many factors such as the degree of exposure of the flour to the air and the temperature of the air can affect the rate of oxidation of the flour. It has been suggested that pneumatic transfer of flour at the mill and the bakery accelerate the oxidation process due to the increased exposure of the flour particles to air.

The oxidation of gluten proteins in wheat flour includes the oxidation of sulfhydryl groups, which results in cross-linking of protein chains. This cross-linking inhibits the reduction and interchange of disulfide bonds. The effect of oxidation of gluten proteins on the rheological properties of dough can be demonstrated by load extension tests such as the Brabender Extensigraph test (American Association of Cereal Chemists 1983 Method 54-10). Extended aging of wheat flour results in reduced dough extensibility and increased resistance to extension using the Extensigraph test. Chemical oxidizing agents can directly or indirectly oxidize sulfhydryl groups of gluten proteins when wheat flour has been hydrated and mixed into a dough. Extensigraph tests show that chemical oxidizing agents cause wheat flour doughs to become less extensible and to increase in resistance to extension. The type and level of chemical oxidant, the amount of reaction time and the inherent properties of specific flours all influence the degree of rheological modification to the dough.

The chemical oxidizing agent aziodicarbonamide (ADA) is generally added to bleached wheat flour for bread baking at 10 ppm as a maturing agent and can be added at up to 45 ppm. At high levels of usage, ADA is considered an improver rather than a maturing agent. Up to 50 ppm of the chemical oxidizing agent potassium bromate can be added to wheat flour as an improver, and the resulting flour is referred to as bromated flour.

The chemical oxidizing agent L-ascorbic acid can be added to wheat flour at levels up to 200 ppm and is considered an improver.

Chemical oxidizing agents added to flour have little or no effect on the gluten proteins until the flour is hydrated and mixed into a dough. The rate of reaction of chemical oxidizing agents in a dough varies from rapid for ADA to intermediate for ascorbic acid to slow for potassium bromate. The varying rates of reaction of various chemical oxidants in a dough system make their role in a baking process differ significantly. The rate of reaction of potassium bromate in a dough system is relatively slow and is most effective at the late proofing stages and early oven stages.

The level of chemical oxidation required in bread baking is heavily dependent on the type of process being utilized. Processes where bulk fermentation has been eliminated or reduced to a short time are often heavily dependent on chemical oxidizing agents. Straight dough processes where bulk fermentation is essentially eliminated are referred to as "no-time" straight doughs. Straight dough processes where bulk fermentation is relatively short (less than 1 hour) are referred to as "short-time" straight doughs. Both no-time and short-time straight dough processes traditionally have relied on relatively high levels of potassium bromate. Conventional straight dough processes where bulk fermentation is carried out for 1½ to 2½ hours have a moderate oxidation requirement. Sponge and dough processes where a sponge containing part of the total flour in the formulation is fermented for 3-5 hours, generally have relatively low oxidation requirements.

The United Kingdom and Canada have removed potassium bromate from the list of permitted food additives. In the United States many bakers have voluntarily removed potassium bromate from their formulations and replaced it with a combination of other chemical oxidizing agents.

Potassium bromate free formulations are typically less tolerant to variations in processing conditions than the same formulations containing potassium bromate. The higher the oxidation requirement of a processes, the more noticeable is the lack of tolerance that is experienced when potassium bromate is removed and replaced with combinations of other oxidizing agents, such as ADA, ascorbic acid, or potassium iodate.

In the 1920's and 1930's several researchers studied the use of heat treatment to improve the bread baking quality of wheat flour, as reported in the following documents:

Kent-Jones, D. W. "A Study of the effect of heat upon wheat and flour, especially in relation to strength". Thesis presented to London University (1926);

Herd, C. W., Cereal Chem, VIII, 1 (1931);

Herd, C. W., Cereal Chem, VIII, 145 (1931);

Geddes, W. F., Canada. J. Res., I, 528 (1929);

Geddes, W. F., Canada, J. Res., II, 195 (1930);

Geddes, W. F. Canada. J. Res., II, 65 (1930);

British Patent 180,496 (1922);

British Patent 228,841 (1925);

British Patent 300,291 (1938);

British Patent 300,537 (1938).

Chemical oxidizing agents such as potassium bromate were economical and effective, and such chemical oxidizing agents became widely used.

SUMMARY OF THE INVENTION

One object of this invention is to use a heat treatment process to bring about the oxidation of gluten proteins in wheat flour for bread baking. The degree of oxidation that this process accomplishes can be much higher then that which would be achieved by the maturing agent ADA at the 5-10 ppm level utilized in bleached flours. The process described below is so effective at oxidizing gluten proteins that it can bring a wheat flour to a stabilized oxidation state whereby the flour will not continue to change with storage. Stabilizing the oxidation state of the flour will result in less variation in baking characteristics between freshly milled flour and flour that has been stored for variable periods of time.

According to a first aspect of this invention, a method is provided for improving bread baking characteristics of a bread baking wheat flour by drying the flour by suspending it in a heated, oxygen containing carrier gas having an outlet temperature in the range of about 50°–130° C. for a time sufficient to reduce moisture content of the flour by at least 5 wt % and to increase the ratio of extensigraph resistance to extensigraph extensibility of the flour by at least 20%, both as compared with the initial flour. The flour is then separated from the carrier gas to provide a free flowing, dry powder having a reduced moisture content and an increased value of the extensigraph resistance/extensibility ratio as compared to the initial flour. The heat treated flour can be mixed with dough forming ingredients including water to form a bread dough.

According to a second aspect of this invention, a bread baking wheat flour is provided comprising a gluten protein fraction, wherein an amount greater than about 1 wt % and less than about 5 wt % of the gluten protein fraction is denatured, and wherein the flour has a moisture content less than about 8 wt %. The moisture content of the flour is more preferably less than about 7% wt %.

According to a-third aspect of this invention, a dried flour of the type described below can be mixed with other ingredients including dried yeast to make a bread mix with an unusually long shelf life.

As described in detail below, the preferred embodiments of this invention provide a heat treated bread baking wheat flour with improved extensigraph properties and improved baking properties as compared with the original flour. This invention is particularly useful in increasing gluten strength of relatively low strength flours. The heat treated flour described below has an increased shelf stability and a reduced moisture content. The reduced moisture content of the flour reduces shipping costs associated with flour transport.

DETAILED DESCRIPTION OF THE PRESENTLY PREFERRED EMBODIMENTS

Figure 1:
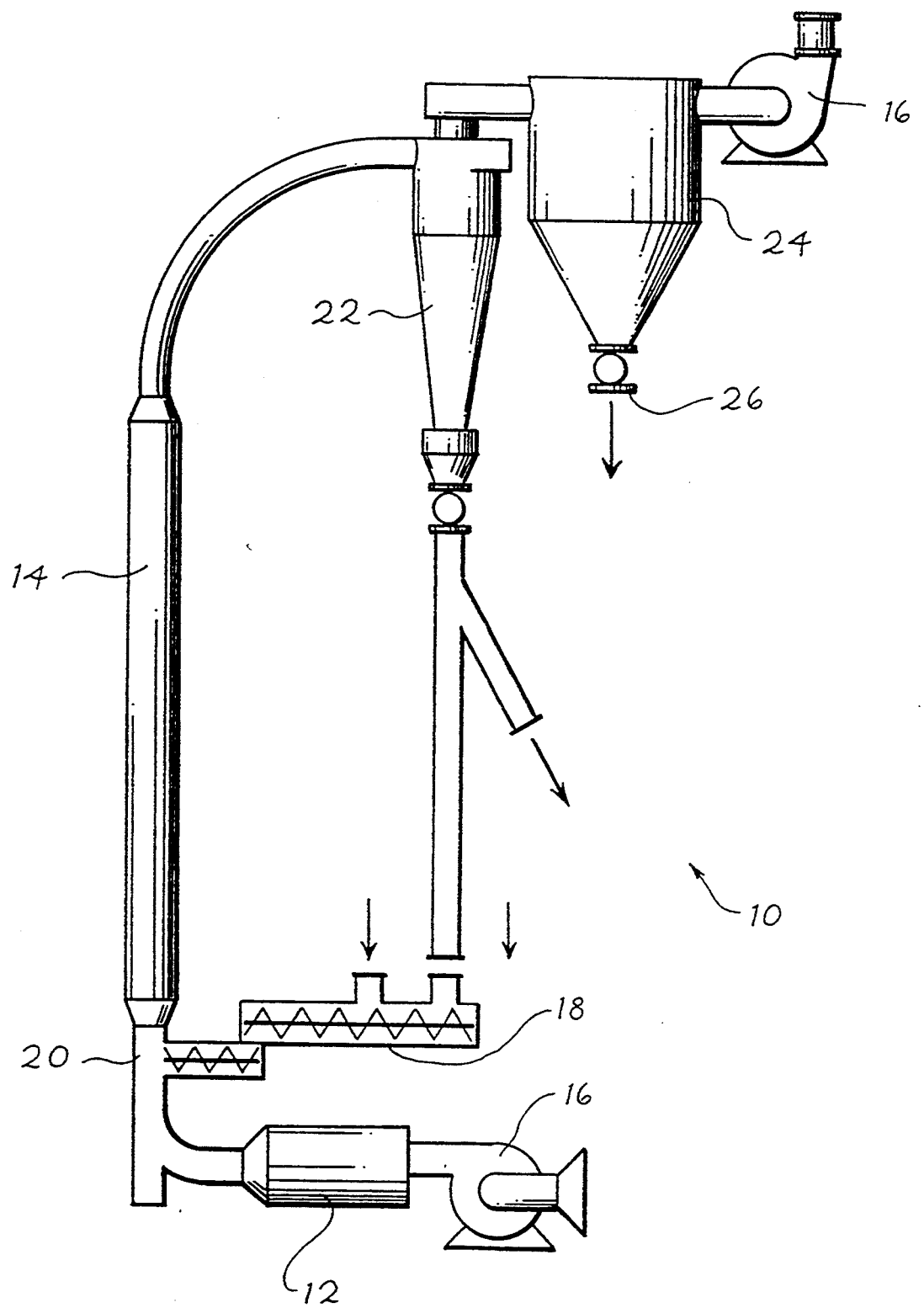
FIG. 1 is a block diagram of a drying apparatus suitable for use with the preferred embodiment of the method of this invention.

The following paragraphs define standard terms used in this specification and the following claims, and then provide a description of the presently preferred embodiments of this invention and a number of specific examples.

Definitions

Bread dough—A dough for making bread, including breads such as white, whole wheat and other breads and related yeast leavened products made from bread type wheat flours, such as pizza crust, rolls, and bagels, whether frozen, refrigerated at temperatures above freezing, or unrefrigerated.

Bread baking flour—A flour suitable for baking bread, including bread such as white, whole wheat and other breads and related yeast leavened products made from bread type wheat flours such as pizza crust, rolls, and bagels.

Wheat flour—A flour milled from any wheat, including hard, soft and durum wheats.

Moisture content—Moisture content of a flour as measured by the air-oven method set out in AACC method 44-16 (revised Oct. 27, 1982).

Ash content—Ash content of a flour as measured by the basic method set out in AACC method 08-01 (revised Oct. 28, 1981).

Farinograph stability—Dough strength as measured by the farinograph method set out in AACC Method 54-21 (revised Oct. 27, 1982). Stability is a measure of a flour's tolerance to mixing, and it is further discussed in the *Farinograph Handbook*, Burt L. D'Appolonia and Wallace H. Kunerth, Editors (Third Edition, 1984, American Association of Cereal Chemists, St. Paul., Minn.).

Falling Number—Alpha amylase activity as measured by the method set out in AACC Method 56-81B (revised Oct. 12, 1988).

Extensigraph resistance ($R_{max}$)—The maximum height of the extensigraph curve in cm. (AACC Method 54-10, 1983).

Extensigraph extension (E)—The total length of the extensigraph curve in cm. (AACC Method 54-10, 1983).

Extensigraph resistance/extension ratio—The ratio $R_{max}/E$ of extensigraph resistance to extensigraph extension.

Straight dough bread baking process—A method of making bread in which all of the ingredients are mixed to form a dough in one operation and then given bulk fermentation prior to dividing and molding.

No-time straight dough bread baking process—A straight dough bread baking process in which the fermentation time prior to dividing and molding is 0–20 minutes.

Short-time straight dough bread baking process—A straight dough bread baking process in which the fermentation time prior to dividing and molding is 20–60 minutes.

Protein fraction—The protein content of flour, measured as a weight percent of the total flour, as determined by AACC Method 44-15A.

Gluten denaturation—Reduction of soluble gluten proteins, measured as a weight percent of the sample normalized to a 14 wt % moisture basis, as determined by the procedure described by Orth and Bushuk, Cereal Chem., 49:268 (1972).

General Discussion

This invention is based on the discovery that by properly selecting heating conditions and time parameters the baking properties of a flour can be improved by a dry heating process. The dry heating process described below utilizes short times and carefully controlled temperatures such that gluten strength is actually increased.

In the preferred embodiment of this invention a bread baking wheat flour is treated with a drying apparatus as shown in attached FIG. 1. This drying apparatus 10 includes a heat exchanger 12 which is connected to a dryer column 14. Fans 16 force a carrier gas such as air or other oxygen containing gas through the dryer column 14. Any appropriate heat source can be used to heat the carrier gas as it passes through the heat exchanger 12, including gas fired heaters and steam heaters. The heat exchanger 12 can also operate with electric heating or can utilize heated waste gases from other processes. Preferably, no water is added to the carrier gas, and the relative humidity of the heated carrier gas is low. Calculations indicate the relative humidity of the heated carrier gas before it comes into contact with the flour is between 2.4% and 0.1%, depending on ambient conditions and the inlet temperature.

The dryer column 14 is designed to fit the particular application, having a diameter determined in the conventional manner by factors such as the evaporative duty, the drying temperature and the velocity required to convey the material. The length of the column is determined by conventional factors to provide the required residence time. Depending upon the application, the dryer column 14 can be shaped and sized to fit within an existing building or to provide the finished product at a required position. Preferably, the fans 16 include conventional control dampers (not shown) to set the air volume and pressure balance at the feed point. When the overall system pressure drop is not high a simple single fan system can be employed. A feeder 18 feeds the incoming flour into the dryer column 14 at a feed point 20. A variety of feeders can be used including vibrating, paddle, or pneumatic type feeders. Hoppers with appropriate discharging facilities can be provided for continuous metering from batch chargers. Conventionally, high air velocities are employed at the feed point 20 to assist in product entrainment and dispersion. Lower velocities are preferably used in the subsequent dryer column 14 to achieve an increased residence time.

The feeder 18 introduces flour into the dryer column 14, and the flour is carried by the moving heated air to a recycle separator 22. If desired, the flour passing out the bottom of the recycle separator 22 can be reintroduced into the feeder 18 to repeat the drying process. Generally this is not done and the entrained flour is separated from the carrier gas by a main separator 24. This treated powder is a free-flowing dry product which is available at the discharge point 26 for collection or bagging. If desired, the treated flour may be cooled at the discharge point 26 to ambient temperature prior to collection or bagging.

A suitable drying apparatus 10 can be obtained from APV Pasilac Limited of Carlisle, Cumbria, United Kingdom identified as a turbo venturi or TV drying system. In the following examples, such a system was arranged to maintain the flour in the heated air for a residence time of 5 to 8 seconds, and to provide an inlet air temperature measured upstream of the feedpoint 20 in the range of 128°-255° C. and an outlet or exhaust air temperature measured upstream of the recycle separator 22 in the range of 50°-130° C. It is believed that the TV drying system provides highly turbulent mixing of the flour and heated air, and that this turbulence contributes to the efficiency of flour modification discussed below. As discussed below, these conditions have been found to provide a flour with surprisingly good baking characteristics. The exhaust air temperature is preferably 50°-130° C., more preferably 50°-110° C., and most preferably 50°-100° C.

In general, the flour starts with a moisture content in the range of 13 to 15 wt %, and moisture content is reduced by at least 5 wt % in the drying apparatus 10, often to a value in the range of 2-8 wt %. When flour with an initial moisture content of 13-15 wt % is heat treated to an outlet or exhaust temperature of 90°-110° C., the final moisture content is often in the range of 2.5-5 wt %. The flour is heated in the carrier gas preferably for a time of less than one minute, more preferably for a time of less than 30 seconds, and most preferably for a time of less than 10 seconds (such as 5-8 seconds).

Farinograph stability is a well known measure of dough strength, which involves forming a dough by mixing flour and water, and then graphing the resistance of the dough to mixing as a function of elapsed time. Conditions are standardized so that maximum resistance is centered at a level equal to 500 Brabender Units (BU), and the elapsed time is measured between the point where the top of the curve first reaches the 500 BU line (arrival time) and the point where the top of the curve leaves the 500 BU line (departure time). This elapsed time is the farinograph stability. In general, the greater the farinograph stability, the greater the strength of the dough and the greater its suitability for bread baking.

Our U.S. patent application Ser. No. 07/868,012 describes a method for heat treating a bread baking wheat flour to increase the stability of a dough mixed from the flour. The present specification clarifies that dough produced from flour processed by this method shows reduced extensibility and increased resistance to extension as compared to a dough produced from the same flour without heat treatment. Oxidation of sulfhydryl groups in the gluten proteins of wheat flour is known to result in reduced extensibility and increased resistance to extension when a dough made from the flour is tested on the Brabender Extensigraph.

The Brabender Extensigraph is a well known instrument for measuring dough characteristics that are important in bread baking. Basically, a flour under test is used to make a dough in a defined manner. Then the dough is formed into a test piece which is clamped in the dough holders of the Extensigraph. After a defined rest period, the Extensigraph is started to stretch the dough until the test piece breaks. The load-extension curve is recorded as an extensigram, with resistance to extension plotted on the vertical axis and extension on the horizontal axis. $R_{max}$ is the maximum resistance to extension (or the maximum height of the extensigram curve). E is the extensibility (or the total length of the curve, from start to breaking of the test piece). The ratio $R_{max}/E$ is greater for doughs with higher resistance to extension and for doughs with reduced extensibility.

When a flour is treated by this method the degree of oxidation of gluten proteins can be varied so as to meet particular requirements for the specific flour and for the particular bread making process. The optimum ratio of resistance to extension to extensibility ($R_{max}/E$) will depend on characteristics of the specific wheat flour, the type of baking process, and the amount and type of chemical oxidizing agents being used in the formulation. With certain baking processes, wheat flour treated by this method may allow for the total elimination of chemical oxidizing agents. In other cases wheat flour treated by this method may allow for a reduction of chemical oxidizing agents. In still other cases, wheat flour treated by this method will result in improved processing tolerance and improved finished baked products when used in potassium bromate free formulations that contain other chemical oxidizing agents.

An additional advantage of wheat flour treated by this method is the resulting increase in the level of solids per given weight of flour. This increased level of solids results in an increased yield of dough per 100 pounds of flour. This increase in dough yield per 100 lbs. of flour holds true when the wheat flour is scaled on an "as is" moisture basis as a direct replacement for the equivalent percentage of wheat flour in a formulation or when scaling the flour on a solids corrected basis to achieve the same level of flour solids as would be in wheat flour at a standard moisture content of 14%.

An additional advantage is that wheat flour treated by this method may in certain circumstances allow for a lower protein content wheat flour (on 14% moisture basis comparison) to be utilized in place of higher protein wheat flour. This is particularly an advantage in hearth baked bread products where higher protein wheat flours are typically used to allow the dough to hold a specific shape in the absence of a pan.

the heat exchanger 12 was heated by direct gas fire. The flour was substantially unmodified and was not bleached, enriched or treated with enzymes or bromate.

The samples started with a moisture content of 13.6 wt %, an ash content of 0.473 wt % (calculated based on a moisture basis of 14%), a protein content of 10.4 wt % (calculated on a moisture basis of 14%), and a falling number of 379 (calculated on a moisture basis of 14%). For ease of conversion, all following ash content, protein content, and falling number determinations are adjusted to a 14% moisture basis. Farinograph and Extensigraph tests were performed on the control sample (Control 1) and Examples 1–5 as set out in Table 1. Farinograph tests were performed in accordance with AACC Method 54-21 (constant dough weight method, flour scaled on a 14% moisture basis). Extensigraph tests were performed in accordance with AACC Method 54-10 (Flour scaled on a 14% moisture basis and mixed on farinograph by the constant dough weight method to farinograph peak; extensigraph measurements taken after 45 minute rest period).

TABLE 1

| SAMPLE | CONTROL 1 | EX. 1 | EX. 2 | EX. 3 | EX. 4 | EX. 5 |
|---|---|---|---|---|---|---|
| Inlet/Outlet Temp (°C.) | NA | 178°/90° | 182°/100° | 187°/110° | 192°/120° | 224°/130° |
| Moisture (wt %) | 13.6 | 4.5 | 3.5 | 2.7 | 3.1 | 2.0 |
| Farinograph Stability | 19.9 | 29.4 | 32.5 | 38.0 | 42.3 | 43.0 |
| $R_{max}$ (cm) | 6.2 | 6.5 | 7.6 | 8.3 | 8.9 | 9.3 |
| E (cm) | 17.5 | 16 | 15 | 13.2 | 11.2 | 10.7 |
| $R_{max}/E$ | .354 | .400 | .506 | .628 | .794 | .869 |

EXTENSIGRAPH TESTS

In the following Examples 1–5, flour was heat treated in a dryer as described above at various inlet temperatures and at various outlet or exhaust temperatures. In general, the inlet temperature was controlled by adjusting the amount of heat supplied by the heat exchanger 12 within the range of 128° C. to 255° C. The exhaust or outlet temperature was measured with a thermocouple upstream of but near the recycle separator 22 and was adjusted for various values between 50° C. and 130° C. by controlling the product feed rate to maintain the desired exhaust temperature. Air was used as the carrier gas, though other oxygen-containing gases are believed suitable. The flour was subjected to elevated temperatures in the dryer column 14 for approximately 5 to 8 seconds, and the temperature of the heat treated flour as measured with a thermometer at the discharge point 26 was about 10° C. less than the outlet temperature. The heat source was separated from the flour from by the heat exchanger 12. Flour was heat treated at the rate of 2200 pounds per hour.

It is known that storing a flour over a long period at low or room temperature will increase the farinograph stability of the flour to a limited extent. This effect was taken into account in the following examples by starting with examples and controls from the same batch of flour and performing the tests on the same day for both the heat treated flours and the respective control flours.

EXAMPLES 1–5 (Table 1)

A 100 percent hard red winter wheat flour was divided into six samples. The control sample was untreated, and was analyzed as described in Table 1 at the same time as the treated flours of Examples 1–5. The flours of Examples 1–5 are heat treated in the manner described above with inlet temperatures and exhaust temperatures as stated at the top of Table 1. In this case, Table 1 shows Extensigraph data for a bread baking wheat flour before heat treatment and after treatment over a range of carrier gas inlet temperatures from 178° C. to 224° C. and outlet temperatures from 90° C. to 130° C. Table 1 also lists the farinograph stability values and moisture contents for the control flour and at each level of heat treatment. Both the extensigraph and farinograph tests were conducted on a solids corrected basis (14% moisture basis). As the heat treatment level increased the farinograph stability increased and the ratio of resistance to extension ($R_{max}$) over extensibility (E) increased. For this particular flour, significant increases in resistance to extension did not occur with flour until an outlet temperature of 90° C. was achieved. A carrier gas outlet temperature greater than 130° C. but less than 140° C. may result in denaturation of the gluten to the point that gluten can no longer be washed from the flour and a dough can no longer be formed from the flour widen it is hydrated and mixed.

Table 1 confirms that the heat treatment process described above increases the gluten strength of the treated flour as compared to the control flour.

EXAMPLES 6–9 (Table 2)

A mixture of hard red winter wheat and hard red spring wheat flour was divided into five samples. The control sample was left untreated, and was analyzed as described in Table 2 at the same time as the heat treated flours of Examples 6–9. The flours of Examples 6–9 were heat treated in the manner described above with exhaust temperatures as stated in Table 2. The flour was substantially unmodified, and was not bleached, enriched or treated with enzymes or bromate. The samples started with a moisture content of 14.1 wt %, an ash content of 0.518 wt %, a protein content of 11.9 wt % and a falling number of 430. The flours were tested as described above in connection with Ex. 1-5, and the results are set out in Table 2.

TABLE 2

| SAMPLES | CONTROL | EX. 6 | EX. 7 | EX. 8 | EX. 9 |
|---|---|---|---|---|---|
| Outlet Temp (°C.) | NA | 50° | 60° | 70° | 80° |
| Moisture (wt %) | 14.1 | 6.7 | 5.9 | 4.6 | 4.1 |
| Farinograph Stability | 16.5 | 21.7 | 22.7 | 25.3 | 27.8 |
| $R_{max}$ (cm) | 8.2 | 10.1 | 11.0 | 11.9 | 12.8 |
| E (cm) | 23.4 | 23.4 | 21.5 | 20.4 | 21.1 |
| $R_{max}/E$ | .350 | .432 | .512 | .583 | .607 |

As before, both the extensigraph and farinograph tests were conducted on a solids corrected basis (14% moisture basis). As the outlet temperature increased from 50° C. to 80° C., the farinograph stability and the ratio $R_{max}/E$ increased. Significant increases in both were obtained with all outlet temperatures, indicating that gluten strength can be increased with outlet temperatures as low as 50° C.

EXAMPLE 10 (Table 3)

A wheat flour made of a blend of hard red winter wheat and hard red spring wheat was divided into a control and a sample. The control was untreated, while the sample was heat treated in the manner described above with an outlet temperature of 80° C. to form Ex. 10. Ex. 10 and the control were tested, with the results shown in Table 3.

TABLE 3

| Sample | Control | Ex. 10 |
|---|---|---|
| Outlet temp. (°C.) | NA | 80° |
| Moisture (wt %) | 13.6 | 6.4 |
| Farinograph Stability | 16.2 | 20.5 |
| $R_{MAX}$ (cm) | 6.1 | 10.3 |
| E (cm) | 21.5 | 23.1 |
| $R_{MAX}/E$ | .283 | .446 |

Table 2 shows that the ratio $R_{MAX}/E$ has increased by 58% for Ex. 10 as compared with the control. Increases of greater than 10% in this ratio are expected for this flour with outlet temperatures of 70° C.

GLUTEN DENATURATION TESTS

Heat treatment of a wheat flour at a carrier gas outlet temperature within the preferable range of 80°–100° C. causes a slight decrease in the amount of soluble gluten proteins and an associated increase in the amount of insoluble residue protein as measured by the gluten denaturation test described by Orth and Bushuk, Cereal Chem., 49:268 (1972). This test measures denaturation of gluten by measuring the loss of protein solubility in dilute acetic acid. At the most preferred conditions for carrier gas outlet temperature this reduction in soluble protein (and therefore the increase in denatured gluten) is greater than 1% but no more than 5% as compared to a control flour. Denaturation on a small scale has been found to be advantageous to bread baking characteristics. Of course, excessive denaturation has an adverse effect on bread baking characteristics.

The decrease in protein solubility resulting from the heat treatment of flour is believed to be due to increased aggregation of the proteins. Increased cross-linking of the protein chains may be responsible for the aggregation, but other mechanisms are possible.

In order to assess the extent to which the heat treatment described above denatures gluten proteins in flour, a flour made from a blend of hard red winter wheat and hard red spring wheat was divided into a control sample (which was not heat treated) and three test samples (which were heat treated as described above with outlet carrier gas temperatures of 90°, 110° and 130° C., respectively). The Orth and Bushuk test described above was then performed on all four samples, with the following results:

| Sample | Outlet Gas Temp (°C.) | Soluble Protein (as a wt % of sample, normalized basis of moisture basis of 14 wt %) | Standard Deviation | % Reduction in Soluble Protein as compared to the Control Sample |
|---|---|---|---|---|
| Control Sample | NA | 8.16 | 0.02 | 0 |
| Test Sample 1 | 90° | 7.92 | 0.02 | 2.9% |
| Test Sample 2 | 110° | 7.55 | 0.10 | 7.5% |
| Test Sample 3 | 130° | 7.11 | 0.00 | 12.9% |

These tests confirm that approximately 3% of the gluten of the flour of Test Sample 1 was denatured, assuming that none of the gluten of the control sample was denatured. This small amount of denaturation has been found to provide important baking advantages as described below. The moisture content of the flour of Test Sample 1 was less than 7 wt %.

BAKING TESTS

EXAMPLE 11

French Hard Rolls by Traditional French Process with No Added Chemical Oxidation Wheat Flour Type: Milled from Blend of Hard Red Winter and Hard Red Spring Wheat
Properties (Control 2)

| | |
|---|---|
| Moisture | 14.0% |
| Protein | 12.1% (14% m.b.) |
| Ash | 0.466% (14% m.b.) |
| Falling Number | 374 (14% m.b.) |
| Farinograph Absorption | 61.1% |
| Farinograph Stability | 18.0 minutes |
| Extensigraph Resistance | 6.5 cm (45 min. rest) |
| Extensigraph Extensibility | 20.0 am (45 min. rest) |
| Resistance/Extensibility Ratio | .325 |

The above flour was heat treated as described above at an inlet temperature of 150° C. and an outlet temperature of 90° C. The analytical and rheological properties were measured as follows:

Properties (Heat Treated Ex. 11)

| Moisture | 4.5% |
|---|---|
| Protein | 12.1% (14% m.b.) |
| Falling Number | 0.466% (14% m.b.) |
| Farinograph Absorption | 61.5% |
| Farinograph Stability | 28.9 minutes |
| Extensigraph Resistance | 10.0 cm |
| Extensigraph Extensibility | 13.5 cm |
| Resistance/Extensibility Ratio | .740 |

The flours (Control 2 and Ex. 11) were baked using the following formulation and procedure:

A. Formulation

| Flour* (14% m.b.) | 750 grams |
|---|---|
| Water* | 435 |
| Compressed Bakers Yeast | 22.5 |
| Salt | 15 |
| All Purpose Vegetable Shortening | 11.25 |
| Granulated Sugar | 15 |

*amount of flour and water actually scaled was corrected so as to give the equivalent amount of solids as 750 grams of flour at 14% moisture content. For the heat treated flour this amounted to 676 grams of flour and 509 grams of water.

B. Procedure
(1) Flour and water were mixed on speed 1 of a Hobart A-120 mixer with a McDuffy bowl and two prong beater for three minutes;
(2) Flour and water dough were placed in an enclosed container for 20 minutes at ambient temperature;
(3) The flour water dough was then returned to the mixer and salt, shortening, and sugar were added to the dough and mixed for 1 minute on speed 1 and 2 minutes on speed 2;
(4) Yeast was then added and the dough was mixed 2 minutes on speed 1 and then six minutes on speed 2 to the point of optimum development;
(5) Dough was fermented for 30 minutes in a cabinet at 81° F. and 87% relative humidity;
(6) Dough was scaled to 2.5 ounces, rounded by hand and allowed to rest 10 minutes at ambient temperature;
(7) Dough was then molded by hand and placed on a corn meal covered cloth and proofed in a cabinet at 81° F. and 87% relative humidity for 70 minutes;
(8) The dough pieces were given a ¼ inch cut down the length of the top ½ inch from each end of the dough piece;
(9) Using a peel board the dough pieces were transferred to the hearth of a gas fired oven and baked for 18 minutes at 425° with light steam for the first 5 minutes;
(10) After baking the rolls were cooled for 30 minutes prior to taking volume readings by rapeseed displacement and evaluation for quality.

C. Results

| Volume (average volume per roll) | |
|---|---|
| Control 2 | 505 cc |
| Ex. 11 | 605 cc |
| Quality Ranking (scale of 1–10 with 10 being highest or most desirable) | |
| Volume | |
| Control 2 | 6 |
| Ex. 11 | 9 |

| -continued | |
|---|---|
| Crumb color | |
| Control 2 | 7 |
| Ex. 11 | 8 |
| Crumb Grain | |
| Control 2 | 6.5 |
| Ex. 11 | 7.5 |
| Texture | |
| Control 2 | 7 |
| Ex. 11 | 8 |
| Overall Quality | |
| Control 2 | 6.5 |
| Ex. 11 | 8 |

The heat treated flour of Ex. 11 showed significantly better performance than the flour of Control 2. The improvement was consistent with what would be expected with increased levels of oxidation of the gluten proteins in wheat flour.

EXAMPLE 12

Conventional Straight Dough Kaiser Roll

Wheat Flour Type: Milled from Blend of Hard Red Winter of Hard Red Spring

Properties (Control 3)

| Moisture | 13.6% |
|---|---|
| Protein | 12.3% |
| Ash | 0.478% |
| Falling Number | 347 |
| Farinograph Absorption | 61.7% |
| Farinograph Stability | 16.2 minutes |
| Extensigraph Resistance | 6.1 cm |
| Extensigraph Extensibility | 21.5 cm |
| Resistance/Extensibility Ratio | .283 |

The above flour was heat treated as described above at an inlet temperature of 150° C. and an outlet temperature of 90° C. The analytical and rheological properties were measured as follows:

Properties (Heat Treated Ex. 12)

| Moisture | 5.1% |
|---|---|
| Protein | 12.3% |
| Ash | 0.478% |
| Falling Number | 336 |
| Farinograph Absorption | 62.0% |
| Farinograph Stability | 28.5 minutes |
| Extensigraph Resistance | 11.1 cm |
| Extensigraph Extensibility | 14.0 cm |
| Resistance/Extensibility Ratio | .742 |

The flours (Control 3 and Ex. 12) were baked using the following formulation and procedure. The flour before heat treatment was also baked with 15 ppm potassium bromate. The flours were malted (0.06% malted barley flour).

A. Formulation

| Flour* (14% m.b.) | 1000 grams |
|---|---|
| Water* | 500 |
| Compressed Bakers Yeast | 25 |
| Salt | 17.5 |
| Granulated Sugar | 45 |
| Diamalt | 20 |
| Whole Egg | 40 |

| -continued | |
|---|---|
| Corn Oil | 40 |

*amount of flour and water actually scaled was corrected so as to give the equivalent amount of flour solids as 1000 grams of flour at 14% m.b. For the control flour this was 995 grams of flour and 505 grams of water. For the heat treated flour this was 906 grams and 594 grams.

B. Procedure (1) Ingredients were mixed on speed 1 for 3 minutes and on speed 2 for 9 minutes for Control 3 and 11 minutes for the heat treated Ex. 7 using a Hobart A-120 mixer with a McDuffy bowl and a three prong beater;

(2) The dough was then fermented in a cabinet set at 86° F. for 2 and ¼ hours;

(3) The doughs were then scaled to 2.5 ounces and rounded by hand and allowed to rest 7 minutes;

(4) The dough balls were then stamped using a Kaiser roll stamp and placed cut side down on a cloth cover with corn meal;

(5) The doughs were then proofed in a cabinet at 86° F. and 87% relative humidity for 90 minutes (6) The proofed dough was placed cut side up on a wood peel board and transferred to the hearth plate of a gas fired oven and baked at 450° F. for 14 minutes with light steam for the first 5 minutes;

(7) One hour after cooling the rolls were measured for volume by rapeseed displacement and evaluated for quality.

C. Results

| Volume (average of two rolls) | |
|---|---|
| Control 3 | 428 cc |
| Control 3 +15 ppm potassium bromate | 420 cc |
| Heat treated Ex. 12 | 437 cc |
| Quality Ranking (scale of 1–10 with 10 being highest or most desirable) | |
| Volume | |
| Control 3 | 9 |
| Control 3 +15 ppm potassium bromate | 9 |
| Heat Treated Ex. 12 | 9 |
| Boldness | |
| Control 3 | 7 (sl. flat) |
| Control 3 +15 ppm potassium bromate | 9 |
| Heated Treated Ex. 12 | 9 |
| Separation of Cut | |
| Control 3 | 6 (blinding) |
| Control 3 +15 ppm potassium bromate | 9 |
| Heated Treated Ex. 12 | 9 |
| Overall Quality | |
| Control 3 | 7.3 |
| Control 3 +15 ppm potassium bromate | 9 |
| Heat Treated Ex. 12 | 9 |

The heat treated flour of Ex. 12 showed significantly better performance than the flour of Control 3. This type of improvement is consistent with an increased level of oxidation of the gluten proteins in the flour.

EXAMPLE 13

No-Time Straight Dough with Retardation Step Using Commercial "Bromate Replacer"

The same flours as in Example 12 (Control 3 and heat treated Ex. 12) were baked in the following formulation and procedure. These flours will be referred to as Control 4 and Ex. 13, respectively.

A. Formulation

| Flour* (14% m.b.) | 1000 grams |
|---|---|

| -continued | |
|---|---|
| Water* | 550 |
| Compressed Bakers Yeast | 30 |
| Salt | 20 |
| Granulated Sugar | 20 |
| All-Purpose Veg. Shortening | 20 |
| NBCT-1 Improver** | 10 |

*amount of flour and water actually scaled was corrected so as to give the equivalent amount of solids as 1000 grams of flour at 14% moisture content. The actual amount scaled for the control was 995 grams of flour and 555 grams of water. For the heat treated flour 910 grams of flour was scaled and 640 grams of water.
**NBCT-1 Improver is a combination of ascorbic acid, ADA, potassium iodate and fungal enzymes marketed by Caravan Products.

B. Procedure (1) The ingredients were mixed on speed 1 for 2 minutes and on speed 2 for 6 minutes on a Hobart A-120 mixer with a McDuffy bowl and a two prong beater;

(2) The doughs were divided to 2.5 ounces, rounded by hand and allowed to rest at ambient conditions for 10 minutes;

(3) The dough balls were then stamped by a Kaiser stamp and placed cut side down on a cloth cover with corn meal and retarded for 24 hours;

(4) After 24 hours the doughs were taken out of the retarder and allowed to sit at ambient temperature for one hour prior to being proofed in a cabinet at 86° F. and 87% relative humidity for 90 minutes;

(5) After proofing the dough pieces were transferred to the hearth plate of a gas fired oven with the cut side up using a peel board and were baked at 450° F. for 14 minutes with light steam for first 5 minutes;

(6) One hour after cooling the volume of the rolls was determined by rapeseed displacement and the rolls were scored for quality characteristics.

C. Results

| Volume | |
|---|---|
| Control 4 | 370 cc |
| Heat treated Ex. 13 | 395 cc |
| Quality Ranking (scale of 1–10 with 10 being highest or most desirable) | |
| Volume | |
| Control 4 | 7 |
| Heat Treated Ex. 13 | 8 |
| Boldness | |
| Control 4 | 7 (sl. flat) |
| Heated Treated Ex. 13 | 8 |
| Separation of Cut | |
| Control 4 | 7 (sl. blind) |
| Heated Treated Ex. 13 | 8 |
| Overall Quality | |
| Control 4 | 8 |
| Heat Treated Ex. 13 | 7 |

The heat treated flour of Ex. 13 showed significantly better performance than the flour of Control 4. This type of improvement was consistent with an increased level of oxidation of the gluten proteins of the flour.

EXAMPLE 14

Cuban Style Bread Using Heat Treated Flour with Ascorbic Acid, ADA and Fungal Amylase Added The same flours as in Example 12 (before and after heat treatment) had 90 ppm ascorbic acid, 45 ppm ADA, and ½ ounce of Doh-Tone 2 (fungal amylase from Aochem N.A.) added to them. The resulting flours are identified as Control 5 and Ex. 14, respectively. A high gluten flour (13.6% protein) that was malted and bromated at 50 ppm (typical flour for Cuban style bread) was also evaluated. The following formulation and procedure were utilized:

A. Formulation

|  | Control 5 | Heat Treated Ex. 14 |
|---|---|---|
| Flour ("as is" moisture basis) | 1000 grams | 1000 grams |
| Water | 480 (520 for high gluten) | 600 |
| Instant Active Dry Yeast (SAF) | 56 | 45 |
| Salt | 20 | 28 |
| Lard | 100 | 120 |

Note:
In this example the flour was scaled on an "as is" moisture basis and therefore the heat treated flour with the lower moisture content and greater solids content required more water than the control flour. To keep formulation balanced the levels of yeast, salt and lard were increased for the heat treated flour.

B. Procedure
(1) The ingredients were mixed for 3 minutes on speed 1 of a Hobart A-120 mixer with a McDuffy bowl and a two prong beater;
(2) The dough was then rested for 15 minutes at ambient temperature;
(3) The dough was then sheeted 11 times on a National to simulate a dough-break type developer;
(4) After the last pass of the sheeter the sheeted dough piece was laid on the bench and cut into four 16 ounce pieces;
(5) The dough pieces were molded by hand into 28" long cylinders and placed on wooden peel boards;
(6) The dough was retarded (refrigerated at 45° F.) for 24 hours and then proofed at ambient conditions for approx. 3 hours;
(7) The proofed doughs were transferred to the hearth plate of a gas fired oven and baked at 450° F. for 14 minutes with light steam for the first 5 minutes.

Evaluation of the finished baked breads indicated that the bread made with the heat treated Ex. 14 was acceptable and as good a quality as the bread made with the high gluten flour treated with 50 ppm of potassium bromate. The control flour (Control 5) produced a loaf with lower volume and a more dense crumb structure compared to the heat treated flour (Ex. 14) and the high gluten flour.

The resting period of step 2 can be increased to a time greater than 20 minutes if desired.

EXAMPLE 15

Straight Dough White Pan Bread With No Added Chemical Oxidation (1½ hour fermentation)

The flours of Table 2 were used in the following formulation and straight dough procedure to bake white pan bread:

A. Formulation

| Flour* | 700 gms |
|---|---|
| Water** | 427 mls |
| Yeast | 21 gms |
| Non-Bromated Yeast Food | 3.5 gms |
| Salt | 14 gms |
| Sugar | 42 gms |
| Vegetable Shortening | 19.95 gms |
| Atmul-500 | 1.05 gms |

*Flour usage based on 14% moisture flour
**Water usage varies depending on the correction to 14% moisture flour.

B. Procedure
(1) Liquid ingredients followed by the dry ingredients were placed in a Hobart A-120 two prong McDuffy mixing bowl.
(2) Samples were mixed on low speed for 1 min., followed on second speed for 6 mins. to produce full development of the dough.
(3) The dough piece was allowed to ferment at 86 deg F. with light humidity for 90 mins.
(4) Divided the dough piece into scaling weight of 539 gms. This formula usually allows for the production of two dough pieces at this amount.
(5) Sample dough pieces were sheeted at ⅜" setting followed by a sheet at 3/16".
(6) Dough pieces were trifolded and allowed to rest for 17 mins before machine moulding.
(7) Machine roller settings utilized were #1 roller—0.2, setting for #2 roller—0.1. Pressure board in and out were set at 1⅜".
(8) Dough pieces were placed through the machine moulder after the 17 mins rest.
(9) Placed in pans and placed in proof cabinet set at 110 degrees F. with enough humidity to keep doughs at 70% or better.
(10) Samples removed after obtaining a height of ¼" above the pan.
(11) Bakes in a rotating gas oven set at 400 degrees for 18 mins.
(12) Bread samples immediately depanned and allowed to cool for 1 hour before bagging.

C. Results

The resulting white pan bread was evaluated as to seven important characteristics, and a weighted score was generated as follows:

| Volume | 25% |
|---|---|
| Crumb cell size, structure and uniformity | 25% |
| Dough handling | 15% |
| Mixing tolerance | 15% |
| Crumb texture and body | 10% |
| Symmetry | 5% |
| Crumb brightness and color | 5% |

The resulting bake volumes and weighted scores were as follows:

| Sample | Volume (cc) | Score |
|---|---|---|
| Control | 2600 | 82 |
| Ex. 6 (50° C.) | 2688 | 82 |
| Ex. 7 (60° C.) | 2750 | 86 |
| Ex. 8 (70° C.) | 2663 | 77 |
| Ex. 9 (80° C.) | 2563 | 72 |

These tests indicate that heat treatment with an outlet temperature of 60° C. was optimal for this application. Such lower outlet temperatures cause the flour to mature to a degree that could be obtained by natural aging of the flour. This is in contrast to the higher outlet temperatures discussed above, which modify the flour to a greater extent than natural oxidation, and which cause conformational changes in the flour proteins as indicated by denaturation tests.

ADA is normally added to flour at 5-15 ppm as a maturing agent, but ADA may have marketing or regulatory disadvantages now and in the future. The ability to accelerate natural oxidation by heat treatment is therefore advantageous.

EXAMPLE 16

Sponge And Dough White Pan Bread With No Added Chemical Oxidation

The flours of Table 2 were used in the following formulation and sponge and dough procedure to bake white pan bread:

A. Formulation

| Sponge: | Flour* | 490 gms |
| --- | --- | --- |
| | Non-Bromated Yeast Food | 3.5 gms |
| | Yeast | 17.5 gms |
| | Atmul-500 | 3.5 gms |
| | Water** | 272 mls |
| Dough: | Flour* | 210 gms |
| | Whey | 21 gms |
| | Corn Sugar | 21 gms |
| | Wytase | 1.75 gms |
| | Vegetable Shortening | 17.5 gms |
| | Salt & Sugar Solution*** | 104 mls |
| | Water** | 79 mls |

*Flour is adjusted on a 14% Moisture Basis
**Water applied in this formula is at a 61% Absorption for 700 grams of flour.
***Salt & Sugar Solution is prepared using the following ingredients: 240 gms of salt 600 gms of sugar 1200 mls of tap water From this formula, 104 mls are utilized in each dough for the given sponge & dough formula.

B. Procedure (1) Liquid ingredients followed by the dry ingredients were placed in a Hobart A-120 two prong McDuffy mixing bowl.
(2) Sponges were mixed on low speed for 1 min, 1 min on second speed.
(3) The sponges were allowed to ferment in the cabinet for 4½ hrs at 86 deg F. and with light humidity.
(4) Sponges were removed and introduced to the mixing bowl along with the dough ingredients. Sponges were added to the remix dough ingredients in three equal amounts during the 1 min mix on low speed.
(5) Mixer was placed in second speed and the samples were mixed until optimum development. For this series of samples as an example, 9 to 10.5 mins were needed for optimum development.
(6) After mixing the doughs to full development they were placed back into the fermentation cabinet for 35 additional minutes. Conditions of temperature and humidity remained the same as the previous 4½ hour ferment.
(7) Samples were removed from the ferment cabinet and divided into 520 gm dough pieces. This formula allows for the production of two dough pieces at this amount.
(8) Sample dough pieces were allowed to rest on the table for 6 mins prior to sheeting.
(9) Dough pieces were sheeted at ⅜" setting followed by a sheet at 3/16".
(10) Dough pieces were trifolded prior to placing through the machine moulder.
(11) Machine roller settings utilized were #1 roller—0.2, setting for #2 roller—0.1. Pressure board in and out were set at 1⅝".
(12) Dough pieces were then placed through the moulder and panned prior to proofing.
(13) Placed the pans in a proof cabinet set at 110 degrees F. with enough humidity to keep doughs at 70% or better.
(14) Samples were removed from cabinet after obtaining a height of ¼" above the pan.
(15) Baked in a rotating gas oven at 400 degrees for 18 mins.
(16) Bread samples were immediately depanned and allowed to cool for 1 hours before bagging.

C. Results

The resulting white pan bread was evaluated using the same weighted score as in Example 15. The resulting volumes and weighted scores were as follows:

| Sample | Volume (cc) | Score |
| --- | --- | --- |
| Control | 2775 | 88 |
| Ex. 6 (50° C.) | 2863 | 92 |
| Ex. 7 (60° C.) | 2875 | 86 |
| Ex. 8 (70° C.) | 2788 | 72 |
| Ex. 9 (80° C.) | 2563 | 59 |

These tests indicate that heat treatment with an outlet temperature of 50° C. was optimal for this application. This is consistent with the fact that sponge/dough processes and conventional straight dough processes have lower oxidation requirements than do short time and no-time straight dough processes.

YEASTED BREAD MIX TESTS

Flour was heat treated and dried with the apparatus of FIG. 1 to a moisture content of 4-5 wt %. The dried flour was mixed with instant active dry yeast and other ingredients to make a bread mix which is free of chemical oxidizing agents, and the shelf life of this mix was compared with comparable mixes made with regular flour at 13-15 wt % moisture content or conventionally dried flour at 9-11 wt % moisture content. Shelf life is limited by yeast activity, and the low moisture content of the mix made with the flour of this invention results in a surprisingly long shelf life.

Comparative tests of shelf life were made with bread mixes made with the following formulation:

| Ingredient | Wt. % |
| --- | --- |
| Flour | 82.20 |
| Sugar, fine granulated | 8.30 |
| Vegetable shortening, all purpose plastic | 3.00 |
| Milk, nonfat dried | 3.00 |
| Yeast, instant active dry | 1.95 |
| Salt, fine blending | 1.55 |
| | 100.0 |

Ten ounces of this dry mix when mixed with ¾ cup of water in a bread machine gives a one pound loaf of bread.

In general, the amount of dry yeast can vary between 0.75 wt.% and 3.0 wt % of the mix, the amount of flour can be between 70 wt % and 90 wt %, and the mix can include other constituents as appropriate for the application. The flour of this invention at a moisture content of 4-5 wt % provides a yeasted bread mix with a shelf life three times greater than a comparable yeasted bread mix made with regular flour at 13-15 wt %. Conventionally dried flour at 9-11 wt % moisture content only marginally improves the shelf life of the mix as compared to regular flour.

In general, the method of this invention can be used to dry flour to a moisture content lower than 8 wt %, and the resulting dried flour can be mixed with dry yeast to produce a yeasted bread mix with an improved shelf life.

BLENDED FLOUR EMBODIMENTS

If desired, the heat treated flours described above can be blended with conventional flour that has not been heat treated. The resulting blend often exhibits improved baking characteristics as compared with the conventional flour prior to blending. Such blending can be used to increase the strength and baking quality of a weak flour, to retain required baking functionality when higher protein flour is partially replaced with a lower protein, heat treated flour, or to modify the baking characteristics of a flour for a specific baking application.

Blending proportions will vary widely, depending on the flour, the heat treatment, and the baking application. It is anticipated that blending ratios (heat treated flour:conventional flour) in the range of 5:95 to 75:25 will be particularly useful. Heat treated flour that has been partially denatured as described above with higher temperature heat treatment (outlet temperatures of 80°-130° C.) is particularly well suited for blending.

For example, flour heat treated to an outlet temperature of 130° C. may be blended with conventional flour at a ratio of 5:95 to 10:90. In another example, flour heat treated to an outlet temperature of 90° C. may be blended with conventional flour at a ratio of 50:50.

Blending provides a number of advantages. Flour can be heat treated in one location and then shipped to another location for blending. This approach may have cost advantages over shipping special wheat into a location in need of higher strength flour. Additionally, blending reduces the amount of flour to be heat treated, and therefore the associated capital and operating costs.

Certain of the following claims include a mixing step in which heat treated flour is mixed with dough forming ingredients. This mixing step is intended to be interpreted such that the dough forming ingredients can include untreated flour, whether mixed with the heat treated flour early (prior to shipment to the user) or late (at the time the dough is formed).

CONCLUSION

As should be apparent from the foregoing examples, the heat treatment process of this invention produces an improved flour that, depending upon the baking process and the specific wheat flour used, may allow for the elimination of all chemical oxidizing agents. Alternately, the method and flour of this invention allow for improved baking performance and tolerance in formulations that contain chemical oxidizing agents such as ascorbic acid, ADA, and potassium iodate as a replacement for potassium bromate.

The optimum heat treatment parameters have been found to vary, depending to a large extent on the baking process being used. No-time and short-time straight doughs have a high oxidation requirement, and in many cases the degree of modification brought about by an outlet temperature of 80°-100° C. is preferred. Baking processes such as sponge and dough have a lower oxidation requirement, and the preferred outlet temperature is also lower, often in the range of 50°-70° C.

The heat treatment process and flours described above eliminate the undesirable baking characteristics of freshly milled flour and produce a flour in a stable oxidation state which will tend not to oxidize with storage as is the case with ordinary flour. By stabilizing the flour in this way, more uniform processing characteristics can be obtained at the bakery as the bakery changes from one lot of flour to another that differ in age. The heat treatment method and flour described above provide improved rheological dough properties including an increased tolerance to mixing as measured by the Brabender Farinograph and an increase in the resistance to extension and a decrease in extensibility as measured by the Brabender Extensigraph.

The examples set out above are intended to illustrate but not to limit the scope of this invention, which is defined by the following claims, including all equivalents.

We claim:

1. A method for improving bread baking characteristics of a bread baking wheat flour comprising the following steps:
    (a) providing a quantity of a bread baking wheat flour;
    (b) drying the flour by suspending the flour in a heated, oxygen-containing carrier gas having an outlet temperature in the range of about 50-130 degrees C. for a time less than about one minute sufficient to reduce moisture content of the flour by at least 5 wt % and to increase the ratio of extensigraph resistance to extensigraph extensibility of the flour by at least 20%, both as compared with the flour provided in step (a);
    (c) separating the flour from the carrier gas to provide a free flowing dry powder having a reduced moisture content and an increased value of said ratio as compared with the flour provided in step (a).

2. The method of claim 1 wherein the outlet temperature is in the range of about 80-100 degrees C.

3. The method of claim 1 wherein the outlet temperature is in the range of about 50-70 degrees C.

4. The method of claim 1 wherein the time is less than 30 seconds.

5. The method of claim 1 wherein the time is less than 10 seconds.

6. The method of claim 1 wherein the flour provided in step (a) has an initial moisture content in the range of 13 to 15 wt %.

7. The method of claim 6 wherein the time and temperature of step (b) are selected to reduce the moisture content of the flour to less than about 7 wt %.

8. The method of claim 1 wherein the flour of step (a) is selected from the group consisting of hard wheat flour, soft wheat flour, and mixtures thereof.

9. The wheat flour produced by the process of claim 1.

10. A method for making a bread dough with improved bread baking characteristics, said method comprising the following steps:
    (a) providing a quantity of a bread baking wheat flour;
    (b) drying the flour by suspending the flour in a heated, oxygen-containing carrier gas having an outlet temperature in the range of about 50-130 degrees C. for a time less than about one minute sufficient to reduce moisture content of the flour by at least 5 wt % and to increase the ratio of extensigraph resistance to extensigraph extension of the flour by at least 2.0%, both as compared to the flour of step (a);

(c) separating the flour from the carrier gas to provide a free flowing dry powder having a reduced moisture content and an increased value of said ratio as compared with the flour provided in step (a); and (d) mixing at least a portion of the dry powder of step (c) with dough forming ingredients comprising water to form a bread dough.

11. The method of claim 10 wherein the outlet temperature is in the range of about 80-100 degrees C.

12. The method of claim 10 wherein the outlet temperature is in the range of about 50-70 degrees C.

13. The method of claim 10 wherein the time is less than 30 seconds.

14. The method of claim 10 wherein the time is less than 10 seconds.

15. The method of claim 10 wherein the flour provided in step (a) has an initial moisture content in the range of 13 to 15 wt %.

16. The method of claim 15 wherein the time and temperature of step (b) are selected to reduce the moisture content of the flour to less than about 7 wt %.

17. The method of claim 10 wherein the flour of step (a) is selected from the group consisting of hard wheat flour, soft wheat flour, and mixtures thereof.

18. The wheat flour dough produced by the process of claim 10.

19. The method of claim 10 further comprising the step of (e) baking the dough formed in step (d) in a straight dough bread baking process.

20. The method of claim 19 wherein the straight dough bread baking process is a short-time straight dough bread baking process.

21. The method of claim 19 wherein the straight dough bread baking process is a no-time straight dough bread baking process.

22. The method of claim 10 further comprising the step of (e) baking the dough formed in step (d) in a sponge and dough bread baking process.

23. The method of claim 10 wherein the dough forming ingredients of step (c) comprise conventional flour.

24. A bread baking wheat flour comprising a gluten fraction, wherein an amount greater than about 1 wt % and less than about 5 wt % of the gluten fraction is denatured, said flour having a moisture content less than about 8 wt %.

25. The flour of claim 24 wherein the moisture content is less than about 7 wt %.

26. A yeasted bread mix comprising:
a quantity of a dried flour having a moisture content of less than 8 wt %; and
a quantity of dried yeast mixed with the flour;
said yeasted bread mix providing a substantially increased shelf life as compared with a yeasted bread mix comprising flour at 13-15 wt % moisture content.

27. The bread mix of claim 26 wherein the dried yeast makes up between 0.75 wt % and 3 wt % of the yeasted bread mix.

28. The bread mix of claim 27 wherein the moisture content of the flour is less than 6 wt %.

29. The bread mix of claim 26 wherein the bread mix is free of chemical oxidizing agents.

30. A method of making a bread mix comprising the following steps:
(a) providing a quantity of a bread baking wheat flour;
(b) drying the flour by suspending the flour in a heated, oxygen-containing carrier gas having an outlet temperature in the range of about 70-130 degrees C. for a time less than about one minute to reduce moisture content of the flour to less than 8 wt %;
(c) separating the flour from the carrier gas; and
(d) mixing the separated flour with additional ingredients comprising a quantity of dry yeast to form a yeasted bread mix;
said yeasted bread mix providing a substantially increased shelf life as compared with a yeasted bread mix comprising flour at 13-15 wt % moisture content.

31. The method of claim 30 wherein the flour is dried in step (b) to a moisture content of less than 6 wt %.

32. The method of claim 30 wherein the mixing step (d) utilizes additional ingredients that are free of chemical oxidizing agents.

* * * * *

UNITED STATES PATENT AND TRADEMARK OFFICE
CERTIFICATE OF CORRECTION

PATENT NO. : 5,433,966
DATED : July 18, 1995
INVENTOR(S) : Michael J. Wolt et al.

It is certified that error appears in the above-indentified patent and that said Letters Patent is hereby corrected as shown below:

Column 21,

In claim 10, line 13, delete "2.0%" and substitute --20%--.

Signed and Sealed this

Twenty-third Day of April, 1996

BRUCE LEHMAN

Attest:

Attesting Officer

Commissioner of Patents and Trademarks